United States Patent [19]

Smith et al.

[11] Patent Number: 4,598,410
[45] Date of Patent: Jul. 1, 1986

[54] BIDIRECTIONAL REPEATER APPARATUS

[75] Inventors: Walter A. Smith, Kettering; James R. Small, Englewood; Ronald D. Ward, Jr., Trotwood, all of Ohio

[73] Assignee: NCR Corporation, Dayton, Ohio

[21] Appl. No.: 651,502

[22] Filed: Sep. 17, 1984

[51] Int. Cl.<sup>4</sup> ............................................... H04B 3/36
[52] U.S. Cl. ............................................ 375/3; 455/16
[58] Field of Search .......................... 455/15, 16, 601; 370/24, 26; 375/3, 4

[56] References Cited

U.S. PATENT DOCUMENTS

| | | | |
|---|---|---|---|
| 3,943,283 | 3/1976 | Caragliano et al. | 370/24 |
| 4,154,978 | 5/1979 | Tu | 370/26 |

FOREIGN PATENT DOCUMENTS 58-166842 10/1983 Japan ..................................... 375/3

OTHER PUBLICATIONS

Bidirectional Manchester Repeater–NASA Tech. Briefs–Fall 1979, vol. 4, No. 3, p. 324.

*Primary Examiner*—Joseph A. Orsino, Jr.
*Attorney, Agent, or Firm*—Wilbert Hawk, Jr.; Edward Dugas; Richard W. Lavin

[57] ABSTRACT

A bidirectional repeater apparatus includes a plurality of line drivers for driving data signals in the opposite direction over communication lines, logic circuit means operated in response to the driving of the data signals over the communication line for generating trigger signals, a dual one-shot circuit connected to said logic circuit means for enabling the operation of the line drivers when triggered and a feedback circuit operated in response to the driving of a data signal over the communication line in one direction conditioning said logic circuit means to generate a trigger signal operating one of the one-shot circuits to output a signal enabling one of the line drivers to drive a data signal in the opposite direction over the communication line.

14 Claims, 8 Drawing Figures

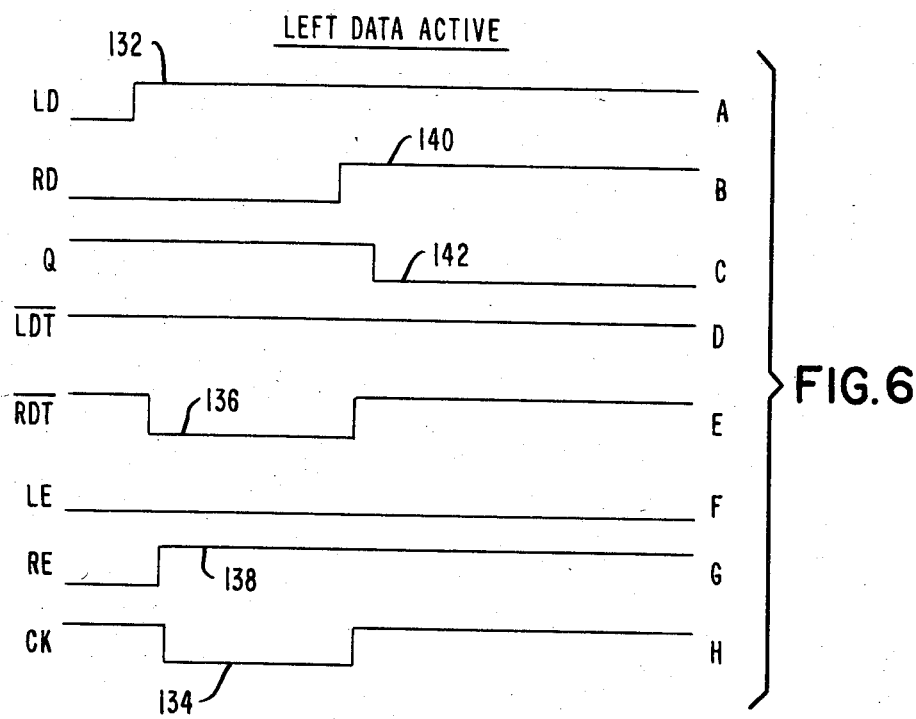
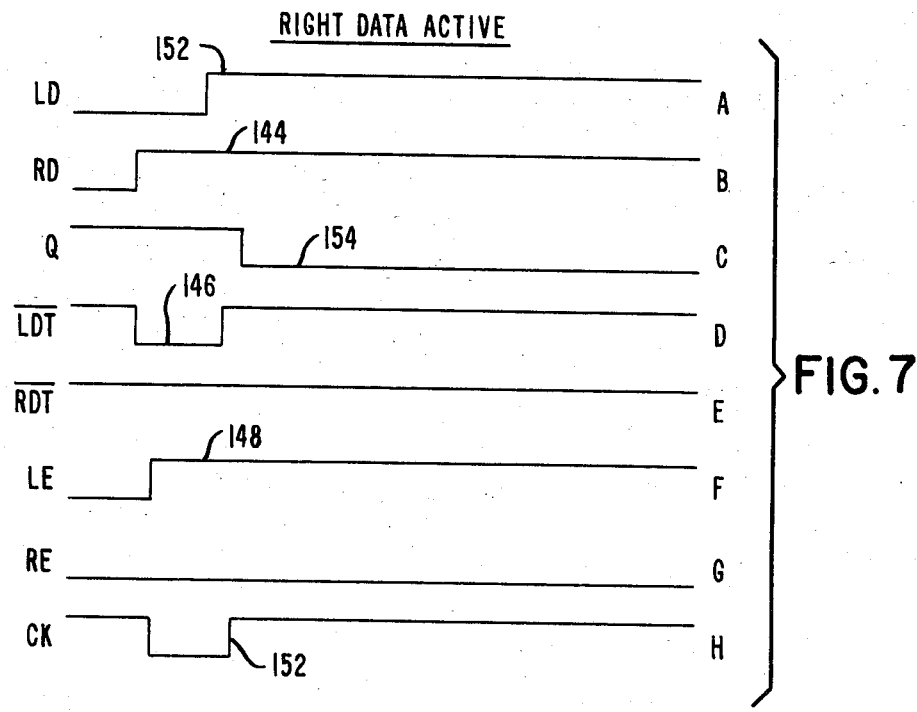

BIDIRECTIONAL REPEATER APPARATUS

BACKGROUND OF THE INVENTION

The present invention is directed to data transmission systems and more particularly to an apparatus for receiving data on an incoming line and transmitting the same data on an outgoing line to a processor.

In data processing systems wherein data is transmitted between two processors, the distance between the processors is critical to the strength of the transmitted signal. To provide the transmission of data signals over long distances, repeaters are employed which receive the data signal, amplify the data signal and then transmit the data signal in the same direction. Prior repeaters have employed one-shot circuits to control the time the repeater is in a transmit mode after receiving a data signal. With present-day data processing systems having processors operating at a very high speed, it has been found that where several repeaters are required to be used in the transmission line, the turnaround time for data to be transmitted in opposite directions limits the amount of data that can be transmitted between two processors. It is therefore a principal object of this invention to provide a repeater which will transmit data in opposite directions at a very high speed.

It is another object of this invention to provide such repeater with the capability of being constructed at a very low cost.

SUMMARY OF THE INVENTION

These and other objects of the invention are fulfilled by providing a repeater which includes a pair of line drivers operating to transmit data in opposite directions, a logic circuit which includes a bi-stable device conditioned by the receive data signals to indicate the direction of the last transmitted data signals, a pair of retriggerable, resettable, one-shot circuits one of which is operated and the other reset in response to the logic circuit receiving a data signal enabling the received data signal to be transmitted and a feedback circuit operated by the transmission of the received data signal to reset the bi-stable device enabling the line drivers to transmit the next received data signal in either direction.

BRIEF DESCRIPTION OF THE DRAWING

The foregoing and various other objects, advantages and meritorious features of the present invention will be apparent from the following detailed description and appended claims, when read in conjunction with the drawings, wherein like numerals identify corresponding elements.

FIGS. 1 and 2, is a diagram showing the manner in which FIGS. 3A and 3B inclusive are arranged to form the block diagram;

FIG. 6 is a diagram showing various waveforms which are present at various points in the repeater when a left data signal is received;

FIG. 7 is a diagram showing various waveforms which are present at various points in the repeater when a right data signal is received.

DESCRIPTION OF THE PREFERRED EMBODIMENT

It should be noted at this time that, throughout this description of the preferred embodiment, the presence of a slash (/) following either a symbol or an acronym represents a logical inversion of that symbol or acronym.

Figure 1:
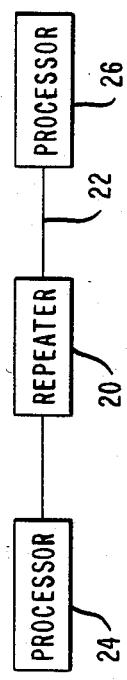
FIG. 1 shows a block diagram of a typical data transmission system showing the location of the repeater in the system.

Referring to FIG. 1, there is shown a block diagram of a data transmission system in which a repeater 20 is located in a transmission line 22 extending between processors 24 and 26. Normally a repeater would be mounted at every 1000 feet of the transmission line 22. When the processor 24 transmits data signals in the form of a plurality of binary signals, the repeater 20, upon receiving each data signal from the processor, will amplify the signal and retransmit the signal over the transmission line 22 to the processor 26. If, upon transmitting the binary signal to the processor 26, the repeater 20 receives a binary signal from the processor 26 for transmission to the processor 24, the repeater of the present invention will transmit the binary signal to the processor 24 at the time it is received rather than waiting for a predetermined time period to have elapsed as is now required by repeaters of the prior art.

Figure 2:
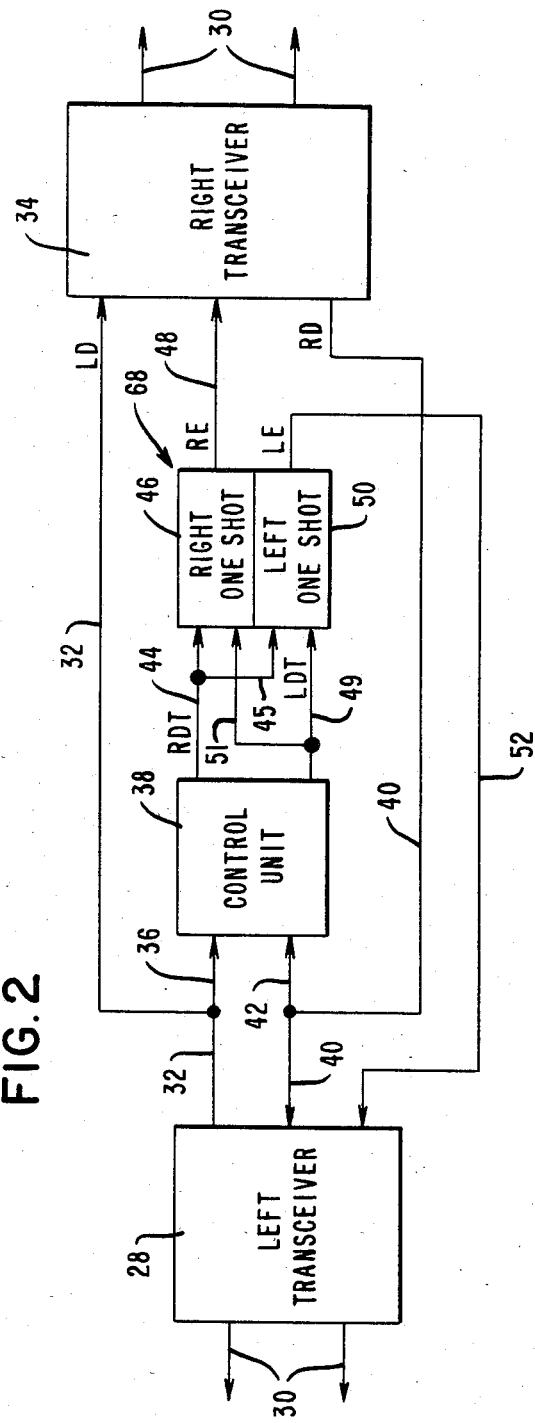
FIG. 2 is a block diagram of the repeater of the present invention.

Referring now to FIG. 2, there is disclosed a block diagram of the repeater of the present invention which includes a left transceiver member 28 which is connected to a pair of twisted wires 30 comprising the transmission line 22 (FIG. 1). The transceiver member 28 is connected over line 32 to a right transceiver member 34 and over line 36 to a control unit 38. The right transceiver member 34 which is connected to the twisted pair of wires 30 of the transmission line 22 is also connected to the left transceiver member 28 over line 40 and to the control unit 38 over line 42. As will be explained more fully hereinafter, the control unit 38 will output a right data trigger signal RDT/ over line 44 to a right one-shot portion 46 of a dual one-shot member generally indicated by the numeral 68 in response to the appearance of the left data signal LD on line 36 transmitted by the left transceiver member 28 over line 32. The triggering of the one-shot portion 44 results in a right enable signal RE being transmitted over line 48 to the transceiver member 34 enabling the member to transmit the left data signal LD present on line 32 over the twisted pair of wires 30 to the processor 26. In a similar manner, the control unit 38 will output a left data trigger signal LDT/ over line 48 to a left one-shot portion 50 of the member 68 which triggers the oneshot portion to output a left enable signal LE over line 52 to the left transceiver member 28 enabling the transceiver member to transmit the right data signal RD appearing on line 40 over the twisted pair of wires 30 to the processor 24. Upon the transmission of a data signal to the control unit 38, the one-shot portion not triggered by the data signal will be reset enabling another data signal to be transmitted in opposite direction.

Figures 3A, 4:
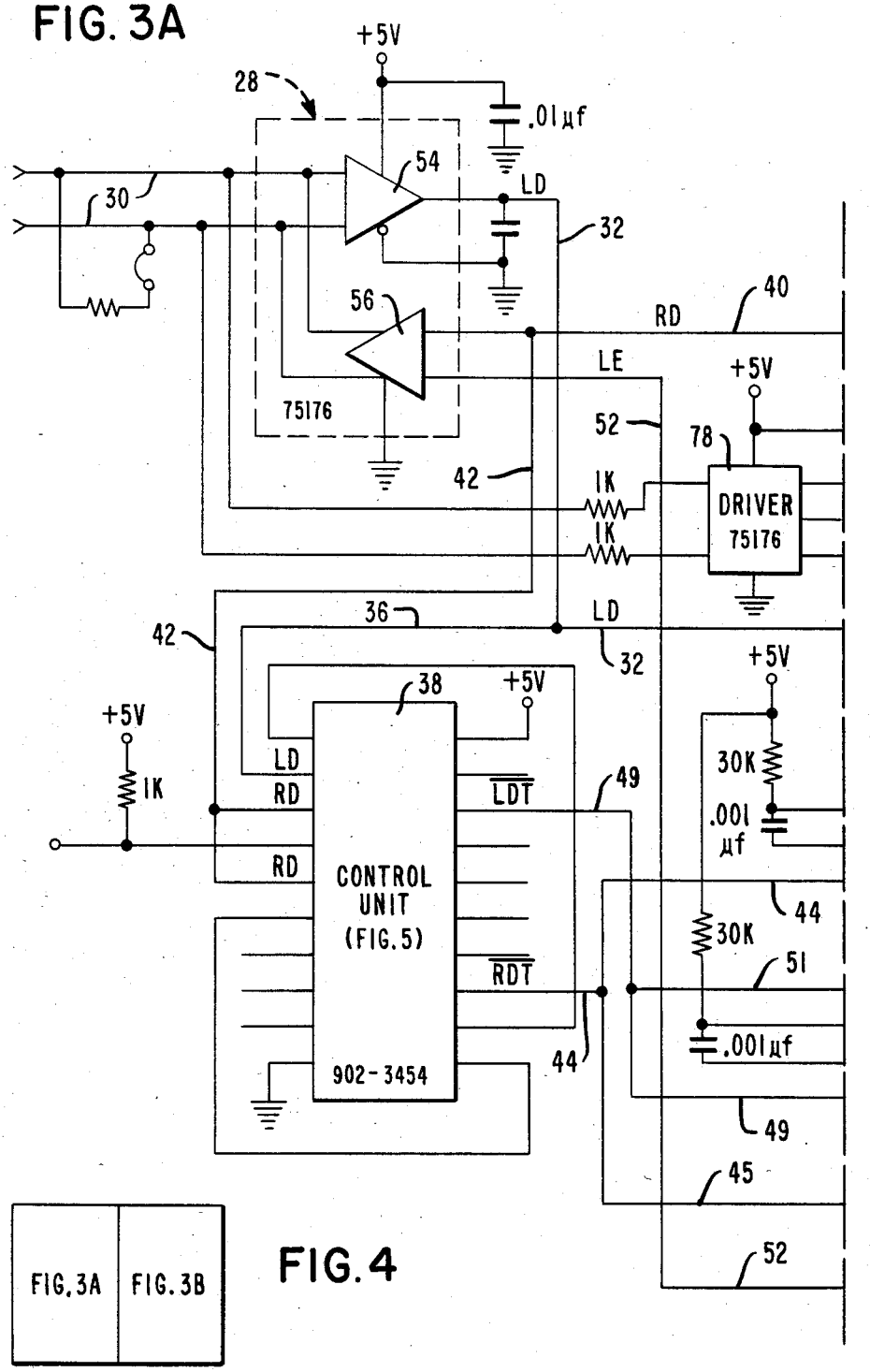
FIG. 3A and 3B inclusive, taken together, disclose a more detailed block diagram of the repeater of the present invention.
FIG. 4, on the sheet containing
Figure 3B:
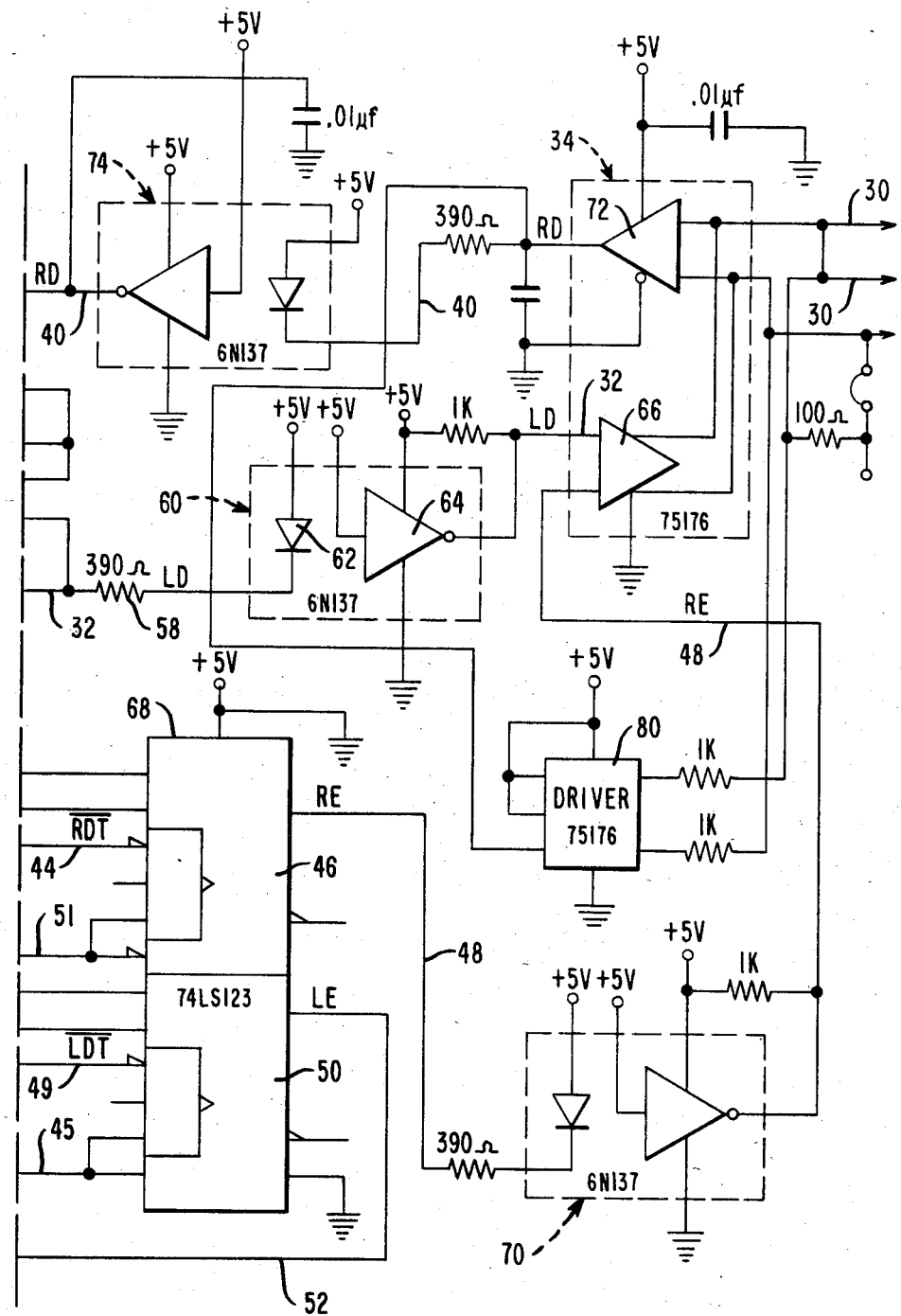

Referring now to FIGS. 3A and 3B, there is disclosed a more detailed block diagram of the repeater of the present invention. The left transceiver member 28 which is commercially available from the Texas Instruments Corporation of Dallas, Tex. as Part No. 75176 includes a pair of driver members 54 and 56 connected to the twisted pair of wires 30. Unless otherwise noted, all IC elements hereinafter identified by part number are commercially available from the Texas Instruments Corporation of Dallas, Texas.

The driver member 54 in the left transceiver member 28 (FIG. 3A) which receives the left data signals LD over the twisted pair of wires 30 from the processor 24 (FIG. 1), will output the signal over line 32 through the resistor 58 (FIG. 3B) to a 6N137 optical coupler member 60 which consists of a light emitting diode (LED) 62 and a photodetector 64 which operates in a manner that is well-known in the art to transmit the data signal appearing on the negative anode of the LED 62. The optical coupler member 60 is commercially available from the Hewlett-Packard Corporation of Palo Alto, California. The photodetector 64 outputs the LD signal over line 32 to one input of a driver member 66 located in the 75176 right transceiver member 34 (FIG. 3B). The driver member 66, when enabled, will output the LD data signal over the twisted pair of wires 30 to the processor 26 (FIG. 1). The data signal LD appearing on line 32 is also transmitted over line 36 (FIG. 3A) to the control unit 38 which comprises a programmable array of gates (FIG. 5) and a flip-flop circuit. The control unit 38 is commercially available from Monolithic Memory Corporation of Santa Clara, Calif. as Part No. 902-3454. As will be explained more fully hereinafter, the control unit 38 will output a trigger signal RDT/(right data trigger) over line 44 to the 74LS123 dual one-shot member 68 (FIG. 3B) which includes the oneshot portions 46 and 50 (FIG. 2). The trigger signal RDT/ will trigger the one-shot portion 46 which outputs the right enable signal RE over line 48 through the optical coupler 70 to the other input of the driver member 66 of the right transceiver member 34 enabling the driver member to output the LD data signals over the twisted pair of wires 30 to the processor 26. The trigger signal RDT/ will also reset the one-shot portion 50 over line 45.

The transmission of the LD data signals by the driver member 66 also enables the driver member 72 of the right transceiver member 34 to output a feedback signal over lines 40 and 42 (FIG. 3A) to the control unit 38 which resets the flip-flop in the control unit 38. If at this time, the processor 26 transmits a data signal intended for the processor 24 (FIG. 1), the data signal will appear on the twisted pair of wires 30 (FIG. 3B) from where it is inputted into the driver member 72 of the right transceiver member 34 as the data signal RD. These signals are transmitted by the driver member 72 over line 40 through a 6N137 optical coupler 74 to one input of a driver member 56 located in the left transceiver member 28 (FIG. 3A). The signal is also transmitted over line 42 to one input of the control unit 38 resulting in the control unit outputting the left trigger signal LDT/ over line 49 to the one-shot portion 50 of the dual one-shot member 68 (FIG. 3B). This signal triggers the one-shot portion 50 which outputs the left enabling signal LE over line 52 to the driver member 56 of the left transceiver member 28 thereby enabling the driver member 56 to output the data signal RD over the twisted pair of wires 30 to the processor 24 (FIG. 1). The signal LDT/ is also transmitted over line 51 to the one-shot portion 46 as a reset signal. The one-shot portions 46 and 50 of the dual one-shot member 68 are normally enabled for a period of eight micro-seconds.

The outputting of the signal RD results in the driver member 54 transmitting a feed back signal to the control unit 38 which resets the flip-flop circuit in the control unit. Further included in the circuit are a pair of 75176 driver members 78 (FIG. 3A) and 80 (FIG. 3B) which sets the voltage level of the twisted pair of wires 30 to a level which dampens out any noise which might be in the wires when the transceivers 28 and 34 are not transmitting. The 5 volt power supply and ground of the drives 78 and 80 and the amplifier circuits of the optional coupler 60 and 70 are isolated from the power supply and ground of the other circuits in FIGS. 3A and 3B.

Figure 5:
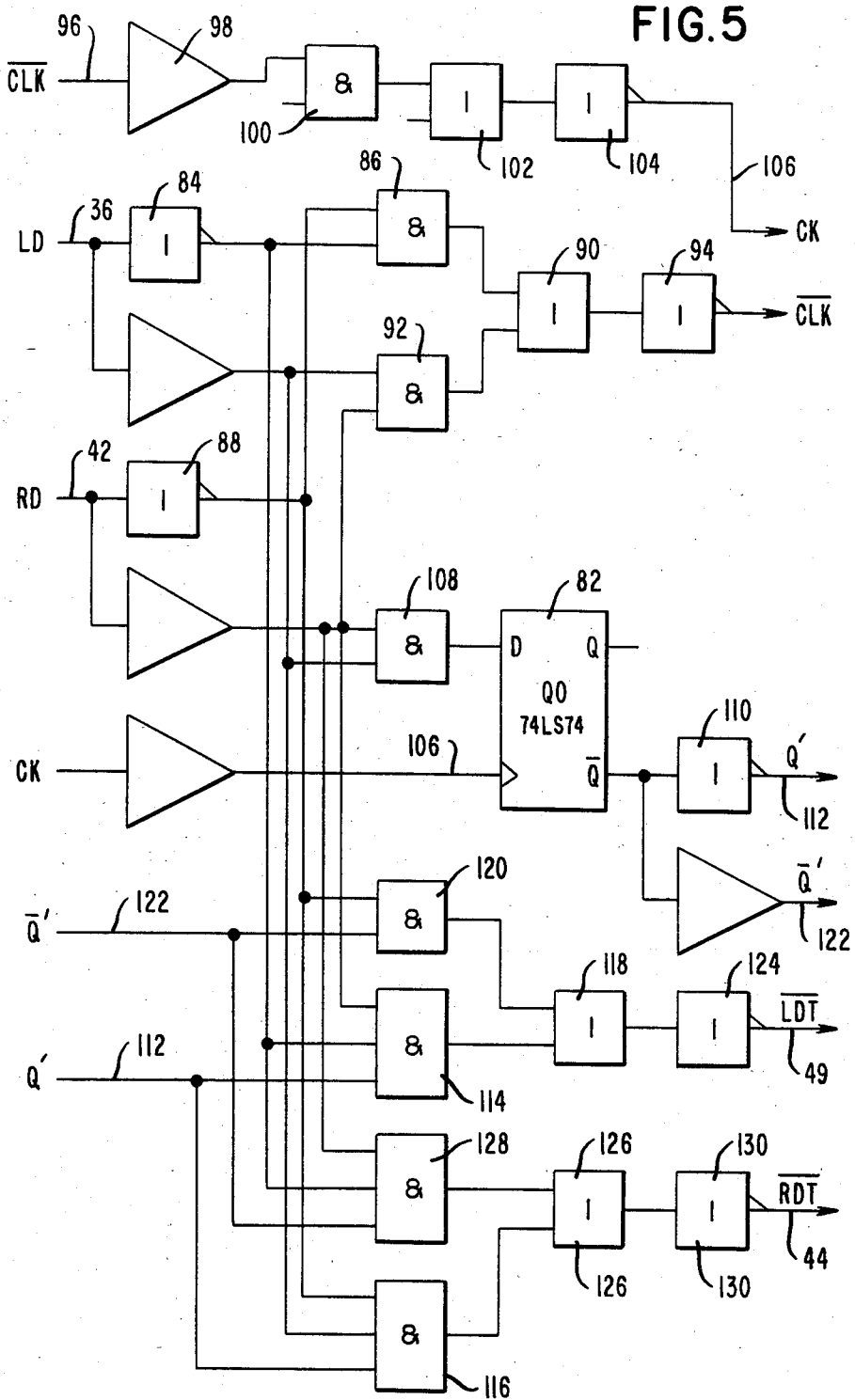
FIG. 5 is a diagram of the logic circuit of the control unit of FIG. 3A.

Referring now to FIG. 5, there is disclosed the logic circuit of the control unit 38 (FIGS. 1 and 3A). Included in the circuit is a flip-flop circuit 82 which is clocked by the clock signal CK generated by the signal level of the data signals LD, RD, appearing on lines 36 and 42 respectively. The left data signal LD is transmitted through an inverter 84 and into one input of an AND gate 86 which also receives the inverted right data signal RD outputted by the inverter 88. The output of the AND gate 86 is inputted into an OR gate 90 which also receives the output of an AND gate 92 which in turn receives the amplified data signals LD and RD. The output clock signal CLK of the OR gate 90 is inverted by the inverter 94 and transmitted over line 96 through the gates 98–104 inclusive from where the clock signal CK is inputted over line 106 to the clock input of the flip-flop circuit 82. This circuit functions as an Exclusive-OR circuit to generate a clock signal when any change in the signal level of the data signals LD RD occur.

The D input of the flip-flop circuit 82 receives a signal from an AND gate 108 which in turn receives the amplified data signals LD and RD. The Q/output signal of the flip-flop member 82 is inverted by the inverter 110 and outputted over line 112 to one input of the AND gates 114 and 116. The AND gate 114 also receives the inverted data signals LD and RD. The AND gate 116 receives the inverted RD signal and the LD signal. The output signal of the AND gate 114 is inputted into an OR gate 118 which also receives the output signal of an AND gate 120 which in turn receives the inverted data signal RD and the Q/ signal of the flip-flop circuit 82 over line 122. The inverted left data signal LDT/ outputted over line 49 (FIG. 3A) from the inverter 124 is inputted into the one-shot portion 50 (FIG. 3B) of the dual one-shot member 68 and over line 51 (FIG. 3A) to the reset input of the one-shot portion 46 (FIG. 3B).

The AND gate 116 receives the inverted data signals RD and LD and outputs a signal into one input of the OR gate 126 which also receives the output signal of the AND gate 128. The AND gate 128 receives the Q/ signal of the flip-flop circuit 82 over line 122, the inverted data signal LD and the data signal RD. The inverted right data trigger signal RDT/outputted over line 44 from the inverter 130 is inputted into the one-shot portion 46 (FIG. 3B) of the dual one-shot member 68 and over line 45 (FIGS. 3A and 3B) to the reset input of the one-shot portion 50 (FIG. 3B). It will thus be seen that the signal levels of the data signals LD and RD together with the output signal Q/ of the flip-flop circuit 82 control the operation of the dual one-shot member 68.

There will now be described an operation of the repeater taken in conjunction with the waveforms disclosed in FIGS. 6 and 7. When a transition occurs on the twisted pair of wires 30 inputted into the left transceiver member 28 (FIG. 3A) indicating the presence of a data signal, the driver member 54 will output the high LD signal 132 (FIG. 6A) over line 40 to one input of the driver member 66 (FIG. 3B). The LD signal appearing on line 36 (FIGS. 3A and 5) will make the CK clock signal 134 (FIG. 6H) go low resulting in the RDT/ trigger signal 136 (FIG. 6E) going low which in turn triggers the one-shot portion 46 of the dual one-shot member 68 (FIG. 3B) and resets the oneshot portion 50. The one-shot portion 46, when triggered, will output the high RE enable signal 138 (FIG. 6E) which enables the driver member 66 (FIG. 3B) to output the high LD data signal 132 over the twisted pair of wires 30 (FIG. 3B) to the processor 26.

The outputting of the high LD data signal also enables the driver member 72 (FIG. 3B) of the transceiver member 34 to feed back the high signal 140 (FIG. 6B) to the control unit over lines 40 and 42 (FIGS. 3A and 5). This signal makes the CK clock signal 136 (FIG. 6H) go high which clocks the flip-flop circuit 82 to enable the Q output signal 142 (FIG. 6C) of the flip-flop circuit to go low, indicating the direction of the last data signal that was received.

If the transceiver member 34 (FIG. 3B) senses a transition on the twisted pair of wires 30, immediately after the triggering of the one-shot portion 46 and the resetting of the one-shot portion 50, the driver member 72 will output the high RD data signal 144 (7B) over line 40 to the driver member 56 (FIG. 3A) of the transceiver member 28 and over lines 40 and 42 to the control unit 38 from which the LDT/ trigger signal 146 (FIG. 7D) will go low triggering the oneshot portion 50 of the dual one-shot member 68 (FIG. 3B) and resetting the one-shot portion 46. The oneshot portion 50 when triggered will output the high LE enabling signal 148 (FIG. 7F) over line 52 enabling the driver member 56 to output the data signal RD over the twisted pair of wires 30 (FIG. 3B) to the processor 24 (FIG. 1). The driver member 54 in response to the outputting of the data signal RD by the driver member 56 will output the high LD signal 152 (FIG. 7A) as a feedback signal over line 32 to the control unit 38 which raises the LDT/ signal 146 (FIG. 7D). The CK clock signal 152 (FIG. 7H) will go high after going low upon receiving the high LD signal 152 which signal clocks the flip-flop circuit 82 resulting in the Q output signal 154 (FIG. 7C) going low. The clocking of the flip-flop member 82 allows the flip-flop circuit to be in a state which indicates the direction from which the last data signal was received and provides for the triggering and resetting of the oneshot portion of the member 68. If the next data signal is received from the same direction, the state of the flip-flop circuit 82 allows the LDT/ trigger signal 146 (FIG. 7D) to again trigger the one-shot portion 50 in the manner described above. Thus the generation of a trigger signal triggers one portion of the dual one-shot member 68 while resetting the other one-shot portion of the member conditioning the other one-shot portion for operation upon the arrival of a data signal.

It will thus be seen that there has been disclosed a repeater which is pulse-sensitive and allows data to be transmitted in opposite directions in the shortest time possible.

Numerous modifications and adaptations of the system of the present invention will be apparent to those skilled in the art, and thus, it is intended by the appended claims to cover all such modifications and adaptations which fall within the true spirit and scope of this invention.

We claim:

1. A bidirectional repeater apparatus connected between a pair of processing units by first and second communication lines for transmitting and receiving data signals transmitted between the processing units over both of said lines comprising:

first transceiver means for transmitting first data signals over said second communication line received from said first communication line when enabled;

second transceiver means for transmitting second data signals over said first communication line and received from said second communication line when enabled;

logic circuit means connected to said first and second transceiver means for generating a first actuating signal in response to receiving said first data signals and a second actuating signal in response to receiving said second data signals;

outputting means connected to said first and second transceiver means and said logic circuit means for outputting a first enabling signal to said first transceiver means in response to said second transceiver means receiving said first data signals over said first communication line enabling said first transceiver means to transmit the first data signals over the second communication line;

and said first transceiver means outputting a feedback signal to said logic circuit means in response to the first transceiver means transmitting the first data signals over said second communication line, said feedback signal enabling said logic circuit means to condition said outputting means to output a second enabling signal to said second transceiver means in response to said first transceiver means receiving said second data signal over the second communication line.

2. The repeater apparatus of claim 1 in which said logic circuit means includes a bi-stable device actuated to a first state in response to the second transceiver means receiving said first data signal over said first cormunication line for outputting a first control signal, and first gating means connected to said bi-stable device for receiving said first control signal and the first data signals for generating said first actuating signal in response to receiving said signals.

3. The repeater apparatus of claim 2 in which said first transceiver means includes feedback means connected to said bi-stable device and said logic circuit means further includes second gating means connected to said bi-stable device, said feed-back means outputting said feedback signal to said bi-stable device and said second gating means in response to the first transceiver means outputting the first data signals received from said second transceiver means, thereby enabling said second gating means to output said second actuating signal to said outputting means enabling said outputting means to output said second enabling signal.

4. The repeater apparatus of claim 3 in which said second transceiver means includes a first driver member for outputting said first data signals received from said first communication line, said first transceiver means further includes a second driver member connected to said first driver member and said second communication line for transmitting the first data signals over said second communication line, said feedback means comprises a third driver member connected to said second driver member and said bi-stable member and said first and second gating means for outputting said feedback signal in response to the second drive member outputting over the second communication line the first data signals recieved from such first driver member.

5. The apparatus of claim 4 in which said outputting means includes first and second one-shot circuits connected to said gating means, said first one-shot circuit enabled by said first actuating signal generated in response to said first drive member outputting the first data signals to said bistable member and said gating means for outputting said first enabling signal.

6. The apparatus of claim 5 in which said second one-shot circuit is connected to said gating means, said gating means outputting a reset signal to said second one-shot circuit in response to the outputting of said first data signal by said first drive member whereby said second one-shot circuit is conditioned to output the second enabling signal in response to the third driver member receiving the second data signals over said second communication line.

7. The apparatus of claim 6 in which the feedback signal and the first data signal are the same signal.

8. A bidirectional repeater apparatus connected between a pair of processing devices by first and second communication lines for transmitting and receiving first and second data signals in the opposite direction over said communication lines comprising:
- a first driver member transmitting first data signals over said second communication line when enabled in response to receiving said first data signals over said first communication line;
- a second driver member connected to said first communication line and said first driver member for transmitting said first data signals, received over said first communication line, to said first driver member;
- a third driver member for transmitting second data signals over said first communciation line when enabled;
- logic circuit means connected to said second driver member for receiving said first data signals, said circuit means outputting a first trigger signal in response to receiving said first data signals;
- a first one-shot circuit connected to said logic circuit means and said first driver member for receiving said first trigger signals, said one-shot circuit outputting a first enabling signal to said first driver member enabling said first driver member to output said first data signals over the second communication line;
- a second one-shot circuit connected to said logic circuit means and said third driver member for enabling said third driver member when operated;
- and first feedback means connected to said first driver member and said logic circuit means for outputting a first feedback signal to said logic circuit means in response to said first driver member outputting said first data signal whereby said logic circuit means is conditioned to output a second trigger signal to said second one-shot circuit operating said second one-shot circuit.

9. The repeater apparatus of claim 8 in which said logic circuit means includes a flip-flop circuit actuated to a first state in response to said second driver member receiving said first data signals, said flip-flop circuit outputting a first control signal when in said first state, said logic circuit means further includes gating means connected to said flip-flop circuit and said second driver member for generating said first trigger signal in response to receiving said first control signal and said first data signal.

10. The repeater apparatus of claim 9 in which said first feedback means comprises a fourth driver member connected to said flip-flop circuit, said gating means and said first driver member for outputting said feedback signal whereby said flip-flop circuit is actuated to a second state conditioning said gating means to output said second trigger signal.

11. The repeater apparatus of claim 10 in which said second one-shot circuit is connected to said third driver member and said gating means, said gating means outputting a reset signal to said second one-shot circuit in response to receiving the first data signal from said second driver member whereby the second one-shot signal is conditioned to output a second enabling signal to said third driver member enabling said third driver member to transmit second data signals over said first communication line.

12. The repeater apparatus of claim 11 in which the feedback signal and the first data signal are the same signal.

13. The repeater apparatus of claim 12 which further includes first optical coupling means connected between said first one-shot circuit and said first driver member for transmitting said first enabling signal.

14. The repeater apparatus of claim 13 which further includes second optical coupling means connected between said second driver member and said first driver member for transmitting said first data signals.

* * * * *